(No Model.)
W. WOOLCOCK.
NUT LOCK.
No. 544,605. Patented Aug. 13, 1895.
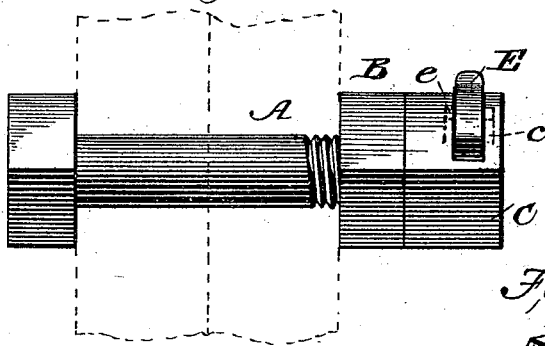
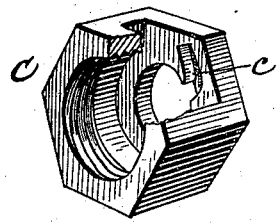
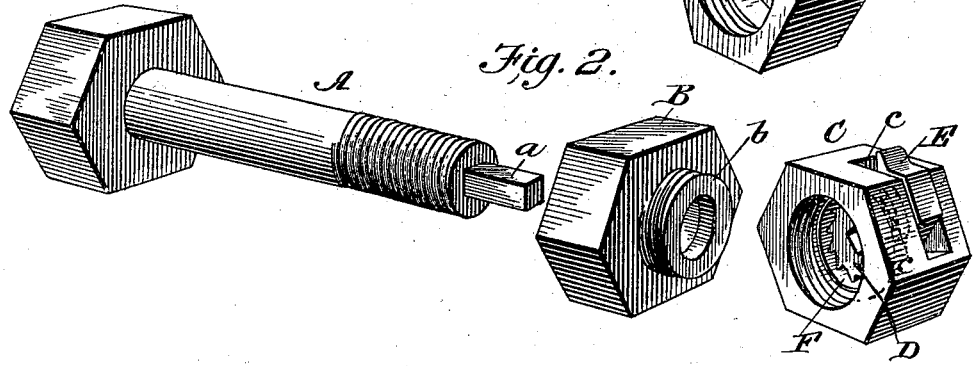
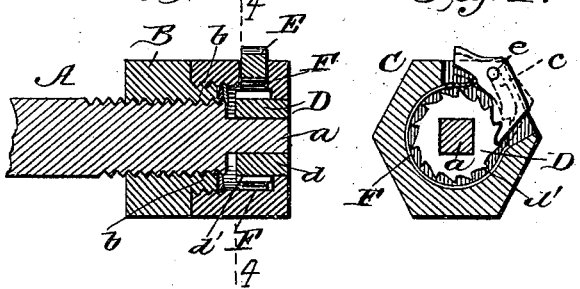
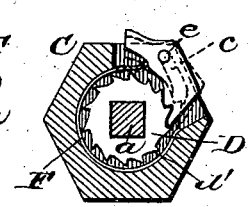
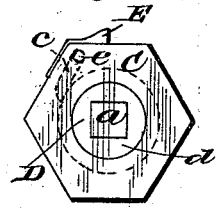
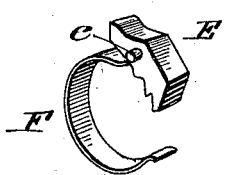
WITNESSES:
M. D. Blondel
Amos W. Hart
INVENTOR
William Woolcock.
BY Munn & Co.
ATTORNEYS.

UNITED STATES PATENT OFFICE.

WILLIAM WOOLCOCK, OF SHAMOKIN, PENNSYLVANIA.

NUT-LOCK.

SPECIFICATION forming part of Letters Patent No. 544,605, dated August 13, 1895.

Application filed August 27, 1894. Serial No. 521,471. (No model.)

*To all whom it may concern:*

Be it known that I, WILLIAM WOOLCOCK, residing at Shamokin, in the county of Northumberland and State of Pennsylvania, have invented a new and useful Improved Nut-Lock, of which the following is a specification.

My invention is an improvement in the class of nut-locks in which the nut is secured on the bolt by means of a washer, or else by a supplemental nut applied to a reduced portion of the bolt.

The invention consists in a certain combination and construction of parts, to wit: a bolt, nut, nut-cap, ratchet, and pawl, as hereinafter described.

In accompanying drawings, Figure 1 is a side view of a screw-bolt and a nut locked thereon according to my invention. Fig. 2 is a perspective view of the bolt and other parts composing the nut-lock separated or detached from each other. Fig. 3 is a central longitudinal section of the nut-lock. Fig. 4 is a transverse section on the line 4 4 of Fig. 3. Fig. 5 is an end view of the nut-lock. Fig. 6 is a perspective view of the pawl and spring. Fig. 7 is a side view of the ratchet.

The threaded end of the bolt A has a reduced and squared extension $a$. The bolt-nut B has an exteriorly-threaded boss $b$ on one side. (See Figs. 2 and 3.)

The cap-nut C is recessed and threaded interiorly at its inner end, and thus adapted to screw on the boss $b$ of the bolt-nut B, as shown in Fig. 3. The other or outer end of the cap-nut C has a central circular opening to receive the circular or cylindrical portion $d$ of the ratchet D. The latter has a toothed portion $d'$, Fig. 7, contiguous to such cylindrical portion $d$, and is provided with a square axial aperture adapted to receive the extension at the bolt A.

The pawl E is pivoted in a radial slot of the cap-nut C, being provided with lateral gudgeons or pivots $e$, that project into opposite grooves $c$, Figs. 1 and 4, formed in the side walls of the slot in the cap-nut C and extending tangentially from the axial opening to a point near the periphery.

The circular divided spring F is adapted to lie in the annular space or cavity, Fig. 4, between the ratchet D and the surrounding wall of the cap-nut C. One end of the spring F acts against the outer arm of the pawl E, thus tending to hold the latter engaged with the ratchet.

In practical use, the nut B and cap-nut C may be first screwed together and then screwed on the bolt A, or the nut B may be first screwed on and then the cap-nut C, with the ratchet D, pawl E, and spring F arranged therein, as shown in Figs. 2 and 4, may be applied and screwed on the boss $b$ or the nut. When thus applied, it is apparent the squared extension $a$ of the bolt A enters the corresponding opening in the ratchet D, and that the latter is thereafter prevented from rotating, and that the engagement of the pawl E with the ratchet D then prevents backward rotation of the cap-nut C, so that the nut B is also locked or held immovable against any force tending to turn it off the bolt A. The nut B may, however, be screwed farther on the bolt, if required, since in such case the pawl E will obviously run free over the inclined teeth of the ratchet D.

In order to remove the cap-nut C and its attached or contained parts, it is only necessary to depress the projecting outer end of the pawl E, whereby its nose or toothed portion will be disengaged from the ratchet D. It is apparent a wrench may be applied to the nut B and cap-nut C at the same time, so as to unscrew both simultaneously.

The grooves $c$ in the cap-nut C permit the pawl E to be easily inserted or removed. The pawl may be inserted in place after and instead of before the cap-nut has been applied to the nut B and bolt A.

It is obvious the extension $a$ of bolt A may have any polygonal shape that will prevent rotation of the ratchet therein, yet permit its removal.

Having thus described my invention, what I claim, and desire to secure by Letters Patent, is—

1. The combination with a threaded bolt having a reduced polygonal extension, and a nut having a threaded boss, of a cap nut adapted to screw on said boss, a ratchet applied to the bolt extension, and a pawl and spring arranged substantially as shown and described.

2. The combination with a threaded bolt having a reduced polygonal extension, and a nut having a threaded boss, of a cap nut which screws on said boss and means for locking it to the bolt, substantially as shown and described.

3. The combination with a threaded bolt, and nut, of a cap nut having a screw connection with the latter, of a pawl and ratchet mechanism for locking the cap nut against backward rotation, substantially as shown and described.

4. The combination with the bolt, nut and cap nut having an axial opening, of a ratchet having a reduced smooth cylindrical portion adapted to fit in said opening, while its lower toothed portion abuts the internal shoulder of the latter, a spring embracing the ratchet proper, and a pawl that engages the latter as shown and described.

5. The combination with the cap nut having a radial recess for a pawl and grooves formed in the opposite parallel sides of said recess and extending to the outer sides of the cap nut, of the pawl, having lateral projections or pivots which are adapted to enter said grooves as shown and described.

WILLIAM WOOLCOCK.

Witnesses:
HENRY C. WELKER,
GEORGE R. WOOLCOCK.